Aug. 17, 1943.     G. A. LYON     2,326,788
WHEEL STRUCTURE
Filed Nov. 25, 1940     2 Sheets-Sheet 1
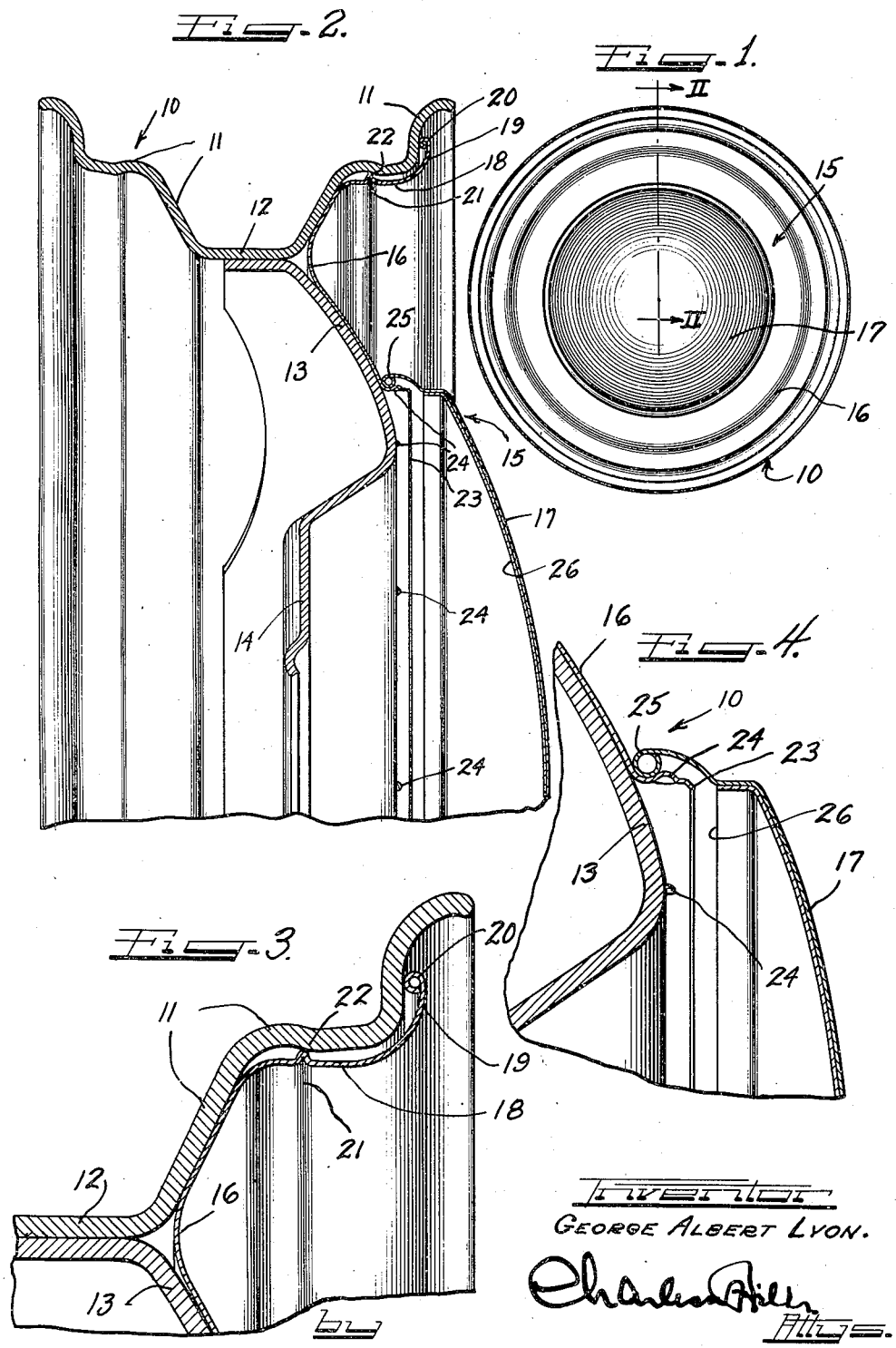

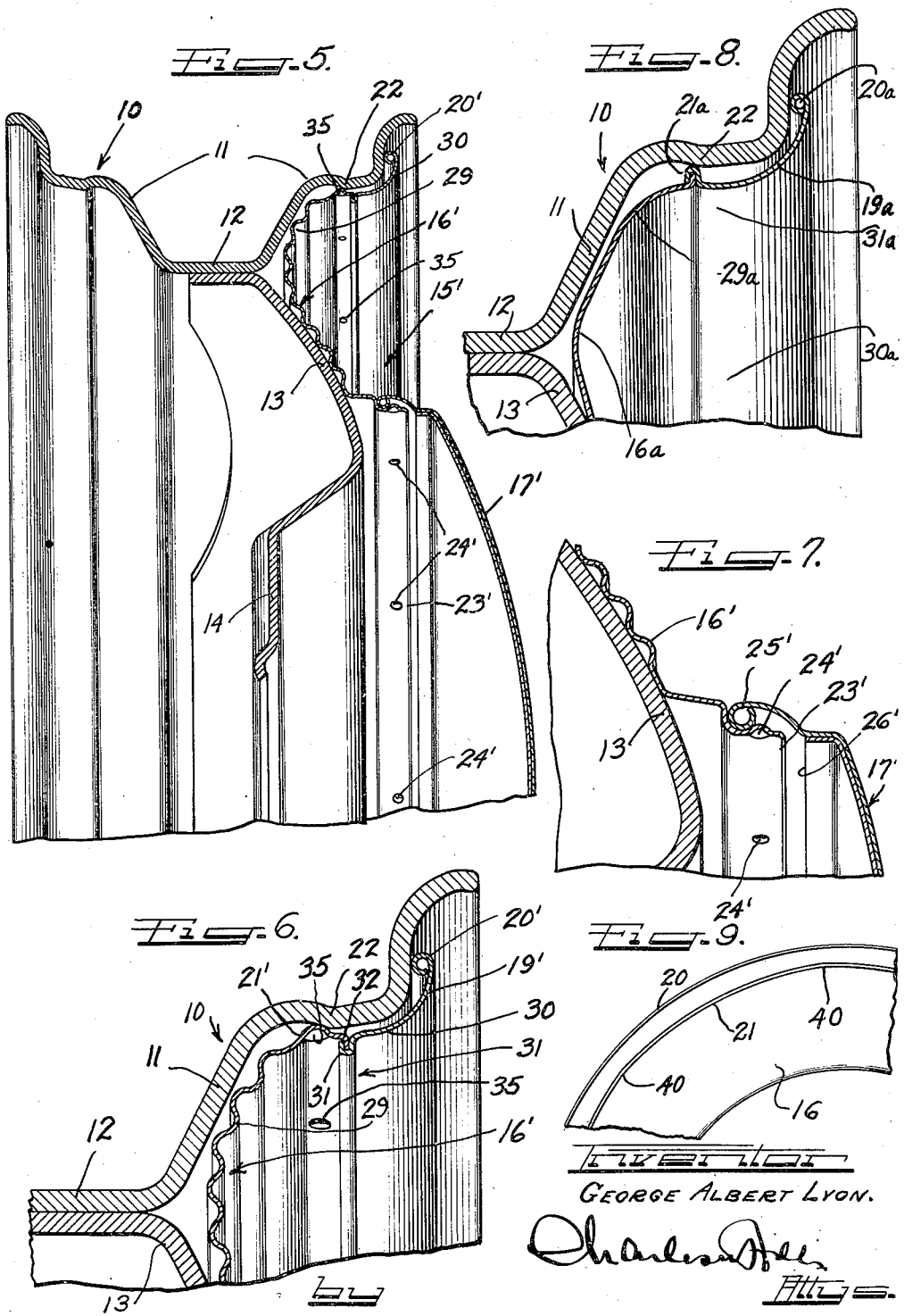

Patented Aug. 17, 1943

2,326,788

UNITED STATES PATENT OFFICE 2,326,788

WHEEL STRUCTURE

George Albert Lyon, Allenhurst, N. J.

Application November 25, 1940, Serial No. 366,972

8 Claims. (Cl. 301—37)

This invention relates to a wheel structure, and more particularly to a wheel cover provided with means cooperable in a new way with the tire rim to hold the cover on the wheel.

An object of this invention is to provide a simple and inexpensive wheel cover having means arranged to enable the cover to be sprung into retained detachable engagement with the tire rim of the wheel.

Still another object of this invention relates to the provision of a multi-part cover member wherein the outer part is spring retained in cooperation with the rim of the wheel and wherein the inner part comprises a hub cap snapped into detachable retained engagement with a flange on the outer part of the cover.

In accordance with the general features of this invention, there is provided in a wheel structure including a flanged and shouldered tire rim a wheel cover cooperable with a shoulder of the rim and which comprises a circular member provided with a ring-like portion having a continuous annular rib projecting substantially radially outward and behind the rim shoulder whereby the cover may be sprung into retained detachable engagement with the tire rim.

A further features of the invention relates to the making of the rib of the foregoing wheel cover of a multiple of thicknesses of metal by lock seaming parts of the wheel cover together at the rib, as well as making the rib non-circular.

Another feature of the invention relates to making the cover of two concentric circular parts, the outer of which is sprung into detachable retained engagement with the tire rim, and the inner of which comprises a hub cap provided with a continuous rear inner edge adapted to be sprung over cooperating bumps on a flange of the outer cover part.

Other objects and features of this invention will more fully appear from the following detailed description taken in connection with the accompanying drawings which illustrate several embodiments thereof, and in which:

Figure 1 is a side elevation of a wheel and cover structure embodying the features of this invention;

Figure 2 is an enlarged fragmentary cross sectional view taken on the line II—II of Figure 1 looking in the direction indicated by the arrows;

Figure 3 is a fragmentary enlarged sectional view corresponding to the upper right hand portion of Figure 2;

Figure 4 is an enlarged cross sectional view corresponding with the central portion of Figure 2;

Figure 5 is a fragmentary cross sectional view similar to Figure 2 illustrating a modification of the invention;

Figure 6 is a sectional view corresponding to the upper right hand portion of Figure 5 but drawn on an enlarged scale;

Figure 7 is a sectional view corresponding to the central portion of Figure 5 but drawn to a slightly enlarged scale;

Figure 8 is a fragmentary sectional view similar to Figures 3 and 6 but illustrating a still further form of retaining means for the wheel cover; and Figure 9 is a fragmentary rear view on a reduced scale of the outer part of the cover shown in Figure 2 illustrating where the rib is out of round.

As shown on the drawings:

The reference character 10 designates generally a drop center type of tire rim which is made up of a plurality of side flanges or shoulders 11 and a base flange 12, the latter of which is suitably fastened to the wheel body or spider 13. The body 13 is of the usual bulged or convex cross section and has the usual central wheel bolt-on flange 14.

Cooperable with this wheel is a multi-part wheel cover embodying the features of this invention and designated generally by the reference character 15. This wheel cover includes two concentric circular parts 16 and 17 which are made from suitable sheet metal. I have obtained excellent results by making wheel covers from stainless steel sheet and from 18–8 steel sheet having a thickness in the neighborhood of .020 of an inch. It is, of course, to be understood that any suitable sheet material may be used, as long as it has the requisite rigidity and resiliency to accomplish the objectives of my invention.

The outer cover part 16 is in the form of an annulus and is shaped generally to conform with the contour of the surfaces of the portions of the rim and body over which it is disposed, as shown in Figures 2 and 3. This part 16 includes a generally axially extending portion 18 adapted to overlie a generally axially extending flange 11 of the ring. The outer extremity of this portion 18 is curved into a generally radially extending portion 19 having its outer edge reinforced by a turned bead 20. This bead may be contiguous with the adjoining flange 11 or it may be spaced therefrom as desired depending upon the construction of the cover. The turned edge or bead 20 is advantageous in that it provides a reinforced area on the wheel cover adapted to be engaged by a pry-off tool when it is desired to forcibly eject the wheel cover from the wheel.

The generally axially extending portion 18 of the cover part 16 is grooved, as shown in Figures 2 and 3, to provide a continuous annular rib 21 which projects substantially radially outward from the portion 18. Then rib 21 is formed out of round at a plurality of joints 40 (Figure 9)

or in other words is normally non-circular. This rib 21 is adapted to be sprung over and behind a shoulder 22 formed in the adjoining axially extending flange 11 of the tire rim 10. By reason of the resiliency of the metal used in the part 16, it, of course, follows that as the rib 21 is forced over the shoulder 22 by the pressing of the wheel cover against the wheel the portion 18, which includes the rib 21, will flex so that the rib upon reaching the rear side of the shoulder 22 is under tension and tightly hugs the shoulder to retain the cover member on the wheel. That is to say the rib 21 is distorted by reason of the pressure on points 40 thereof as the cover is pressed home.

In other words, the portion 18 at the rib 21 is distorted radially at points 40 inwardly as it is pressed over the shoulder and even after reaching the rear side of the shoulder is still under resilient stress, since it is not permitted to reassume its original or normal circular shape. It is by reason of this tendency of the rib 21 to spring back to its original non-circular shape that it is caused to resiliently and tightly grip the rear side of the shoulder 22 so as to hold the cover on the wheel.

As noted before, the cover part 16 is in the form of an annulus and extends over a part of the exposed outer surface of the tire rim, as well as over a portion of the wheel body 13. The inner edge of this annulus 16 is bent axially outwardly into a flange 23 which is provided with a plurality of spaced outwardly projecting radial protuberances 24. These protuberances 24 are cooperable with the rear inner beaded edge 25 of the hub cap part 17. By reason of the fact that the edge 25 is continuous, it follows that when the hub cap is pressed into cooperation with the bumps 24, the edge 25 is distorted out of its normal circular shape, so that it passes over the bumps to the rear surfaces thereof to retain the hub cap on the part 16. As in the case of the rib 21, the beaded edge 25 is not permitted to reassume its normal circular shape when it is on the flange 23, and as a consequence it exerts a resilient pressure on the bumps thereby retaining the hub cap in position.

It should be noted that the hub cap is of a generally concavo-convex cross section and is reinforced at its crown by an inner circular shell 26 suitably secured in place inside of the central portion of the hub cap.

In Figures 5, 6, and 7, I have illustrated a modification of the invention wherein the wheel itself is the same as the wheel described in the first form, and hence I have used the same reference numerals to designate parts of the wheel corresponding to those of the form shown in Figure 3. The wheel cover, as in the case of the preferred form, is made up of two parts 16' and 17', the outer of which comprises an annulus and the inner of which comprises the hub cap. The outer part 16' is corrugated to enhance its rigidity and resiliency, as shown in Figures 5 and 6, but differs from part 16 in that it is made up of two parts joined together. As best shown in Figure 6, the two parts comprise a corrugated part 29 and an outer ring-like part 30, which are joined together into an integral annulus by a lock seam or bead 31. This bead is formed by turning the inner edge of part 30 back upon itself as indicated at 31 and by turning the outer edge 32 of part 29 inside of the turned inner edge 31 of part 30. In actual practice, the turned edge 32 is disposed along the inner edge of the ring 30, and this inner edge is then turned as indicated at 31 about the edge 32 to lock the two parts together. For all intents and purposes, however, once the parts are locked together, they comprise a single annulus 16'. This annulus includes a generally axially extending portion and has a rib 21' which comprises the last or outermost corrugation of the corrugated part 29. This rib 21' is provided with a plurality of outwardly extending protuberances 35 adapted to be sprung over the shoulder 22 on the tire rim in substantially the same manner as the rib 21 is sprung over the shoulder 22 in Figure 3.

From the foregoing, it will be perceived that the seam 31 reinforces the cover adjacent the point where it flexes in the act of swinging the bumps 35 over and into retaining cooperation with the shoulder 22.

The ring 30 includes a radially extending portion 19' which is formed into a turned beaded edge 20' corresponding in function and action to the edge 20.

The central or inner edge of the annulus 16', as best shown in Figure 7, is turned axially outwardly into a flange 23' having a plurality of spaced radial bumps or protuberances 24' cooperable with the turned inner beaded edge 25' of the hub cap 17'. This coaction between the hub cap and the flange 23' is the same as in the previously described form of the invention. Also, the hub cap 17' is reinforced by an inner shell 26' secured in any suitable manner inside of the hub cap.

In Figure 8, I have illustrated a further modification of the invention wherein the same numerals are used to designate the parts of the wheel which are identical to the parts in the other forms of the invention. In this form of the invention, the outer annulus 16a of the cover is made of two parts 29a and 30a lock seamed together at 31a. The connection between the two parts is effected by turning the inner edge of the part 30a over and about the turned outer edge of the part 29a, thereby providing a radially extending multiple thickness rib 21a. This rib 21a is out of round and is adapted to be sprung over and into retaining cooperation with the rim shoulder 22 in the same manner as the rib 21 is sprung over the shoulder in the first described form of the invention. The annulus 16a also includes a generally radially extending portion 19a terminating in a beaded or rolled edge 20a having the same function as the edge 20.

The central or inner edge of the annulus 16a (not shown) may be formed in identically the same way as either of the previously described forms of the invention illustrated in detail in Figures 4 and 7.

It will also be observed that in all forms of my invention I utilize the rim shoulder in the retaining of the wheel cover on the wheel. This shoulder is one of two provided in the rim flanges to prevent slipping or sliding of the tire beads toward the base flange of the rim. Without such shoulders there is a marked tendency of the beads sliding transversely toward the rim base flange when the tire is punctured and thereby occasioning damage to or excessive wear of the tire. Thus these shoulders are employed for a dual function in my novel wheel construction.

I claim as my invention:

1. In a wheel structure including a flanged and shouldered tire rim, the shoulder in said rim being in an axial flange of the rim and comprising a radially depressed annular section defining on one side of the rim a seat for the tire bead and on the other side a cover retaining shoulder, a wheel cover cooperable with said shoulder of said rim comprising a circular member provided with a ring-like portion having a continuous annular rib projecting substantially radially outward therefrom and flexible over and behind said rim shoulder whereby the cover may be sprung into retained detachable engagement with said tire rim, said rib being formed by an annular groove in said portion, and being out of round at a plurality of points.

2. In a wheel structure including a flanged and shouldered tire rim, the shoulder in said rim being in an axial flange of the rim and comprising a radially depressed annular section defining on one side of the rim a seat for the tire bead and on the other side a cover retaining shoulder, a wheel cover cooperable with said shoulder of said rim comprising a circular member provided with a ring-like portion having a continuous annular rib projecting substantially radially outward therefrom and flexible over and behind said rim shoulder whereby the cover may be sprung into retained detachable engagement with said tire rim, said cover comprising two concentric parts lock seamed together in said rib.

3. In a wheel structure including a flanged and shouldered tire rim, the shoulder in said rim being in an axial flange of the rim and comprising a radially depressed annular section defining on one side of the rim a seat for the tire bead and on the other side a cover retaining shoulder, a wheel cover cooperable with said shoulder of said rim comprising a circular member provided with a ring-like portion having a continuous annular rib projecting substantially radially outward therefrom and flexible over and behind said rim shoulder whereby the cover may be sprung into retained detachable engagement with said tire rim, said cover including two concentric circular parts the outer of which includes said portion and the inner of which comprises a hub cap, said rim shoulder holding said outer part concentric with the ring and in position to receive said hub cap centrally of the wheel.

4. In a wheel structure including a flanged and shouldered tire rim, the shoulder in said rim being in an axial flange of the rim and comprising a radially depressed annular section defining on one side of the rim a seat for the tire bead and on the other side a cover retaining shoulder, a wheel cover cooperable with said shoulder of said rim comprising a circular member provided with a ring-like portion having a continuous annular rib projecting substantially radially outward therefrom and flexible over and behind said rim shoulder whereby the cover may be sprung into retained detachable engagement with said tire rim, said cover including two concentric circular parts the outer of which includes said portion and the inner of which comprises a hub cap, said outer cover part comprising an annulus the inner edge of which is formed into an outwardly extending flange forming a seat for said hub cap part.

5. In a wheel structure including a flanged and shouldered tire rim, the shoulder in said rim being in an axial flange of the rim and comprising a radially depressed annular section defining on one side of the rim a seat for the tire bead and on the other side a cover retaining shoulder, a wheel cover cooperable with said shoulder of said rim comprising a circular member provided with a ring-like portion having a continuous annular rib projecting substantially radially outward therefrom and flexible over and behind said rim shoulder whereby the cover may be sprung into retained detachable engagement with said tire rim, said cover including two concentric circular parts the outer of which includes said portion and the inner of which comprises a hub cap, said outer cover part comprising an annulus the inner edge of which is formed into an outwardly extending flange forming a seat for said hub cap part, said flange having a plurality of outwardly extending bumps and said hub cap part including a continuous rear edge sprung over said bumps into retained detachable engagement with said flange.

6. In a wheel structure including a flanged and shouldered tire rim, the shoulder in said rim being in an axial flange of the rim and comprising a radially depressed annular section defining on one side of the rim a seat for the tire bead and on the other side a cover retaining shoulder as well as a body part, a wheel cover cooperable with said shoulder of said rim comprising a circular member having means projecting substantially radially outward therefrom and flexible over and behind said rim shoulder whereby the cover may be sprung into retained detachable engagement with said tire rim, said cover including two concentric circular parts the outer of which includes said means and the inner of which comprises a hub cap, one of said parts having a plurality of radially projecting bumps and the other having a continuous circular edge adapted to be sprung over and behind said bumps to retain said other member on the former.

7. As an article of manufacture, a wheel cover cooperable with a rigid shoulder of a tire rim comprising a circular member provided with a generally axially extending ring-like portion having a substantially continuous annular rib projecting substantially radially outward therefrom and flexible in its entirety when pressed against and over the shoulder of the rim whereby the cover may be sprung into retained detachable engagement with said tire rim, said rib being out of round at a plurality of spaced points and said points being flexible, upon engagement with the rim shoulder, to bring said rib back toward a true circle whereby said points are under stress when said member is on the wheel.

8. As an article of manufacture, a wheel cover cooperable with a rigid shoulder of a tire rim comprising a circular member provided with a generally axially extending ring-like portion having a substantially continuous annular rib projecting substantially radially outward therefrom and flexible in its entirety when pressed against and over the shoulder of the rim whereby the cover may be sprung into retained detachable engagement with said tire rim, said rib being out of round at a plurality of spaced points and said points being flexible, upon engagement with the rim shoulder, to bring said rib back toward a true circle whereby said points are under stress when said member is on the wheel, said member including two concentric parts lockseamed together in said rib.

GEORGE ALBERT LYON.